United States Patent
De Smet et al.

(10) Patent No.: US 10,760,512 B2
(45) Date of Patent: Sep. 1, 2020

(54) METHODS AND SYSTEMS FOR AN AFTERTREATMENT SYSTEM

(71) Applicant: Ford Global Technologies, LLC, Dearborn, MI (US)

(72) Inventors: Frederik De Smet, Genk (BE); Turgay Aslandere, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/393,770

(22) Filed: Apr. 24, 2019

(65) Prior Publication Data

US 2019/0331043 A1     Oct. 31, 2019

(30) Foreign Application Priority Data

Apr. 25, 2018   (DE) .................... 10 2018 206 350

(51) Int. Cl.
| | |
|---|---|
| *F02D 41/14* | (2006.01) |
| *F01N 11/00* | (2006.01) |
| *F01N 3/02* | (2006.01) |
| *F01N 3/033* | (2006.01) |
| *F01N 3/023* | (2006.01) |

(52) U.S. Cl.
CPC ......... *F02D 41/1441* (2013.01); *F01N 3/033* (2013.01); *F01N 11/005* (2013.01); *F01N 3/0231* (2013.01); *F02D 41/1493* (2013.01)

(58) Field of Classification Search
CPC ......... F01N 3/033; F01N 3/0231; F01N 9/00; F01N 11/005; F01N 2900/12; F01N 2900/14; F02D 29/02; F02D 41/0235; F02D 41/1441; F02D 41/1493; F02D 2200/701

USPC ......................................................... 60/274
See application file for complete search history.

(56) References Cited

U.S. PATENT DOCUMENTS

| | | |
|---|---|---|
| 8,903,646 B2 | 12/2014 | Althen et al. |
| 2013/0085733 A1 | 4/2013 | Vartia et al. |
| 2015/0176456 A1 | 6/2015 | Cho et al. |
| 2016/0171133 A1 | 6/2016 | Pfister et al. |
| 2016/0265414 A1* | 9/2016 | Devarakonda ........... F01N 11/00 |
| 2017/0074138 A1* | 3/2017 | Srinivasan ............... F01N 9/005 |
| 2017/0168487 A1 | 6/2017 | Mantripragada et al. |

(Continued)

FOREIGN PATENT DOCUMENTS

| | | |
|---|---|---|
| CN | 1991845 A | 7/2007 |
| CN | 100501750 C | 6/2009 |
| GB | 2535248 A | 8/2016 |

OTHER PUBLICATIONS

Gühnemann, A. et al., "Monitoring Traffic and Emissions by Floating Car Data," Working Paper ITS-WP-04-07, Institute of Transport Studies, University of Sydney and Monash University, Mar. 2004, 19 pages.

(Continued)

*Primary Examiner* — Mark A Laurenzi
*Assistant Examiner* — Dapinder Singh
(74) *Attorney, Agent, or Firm* — Geoffrey Brumbaugh McCoy Russell LLP

(57) ABSTRACT

Methods and systems are provided for adjusting engine operating parameters in response to an emission output from vehicles within a region. In one example, a method comprises adjusting engine operating parameters in a portion of the vehicles to decrease an emission output therefrom.

20 Claims, 6 Drawing Sheets

(56) References Cited

U.S. PATENT DOCUMENTS

2017/0285181 A1 10/2017 Zheng et al.

OTHER PUBLICATIONS

Birch, S., "New Virtual Tools Tackle Real-world Emissions Testing," SAE International Website, Available Online at http://articles.sae.org/14952/, Aug. 14, 2016, 2 pages.
Jamei, E. et al., "Investigating the Role of Virtual Reality in Planning for Sustainable Smart Cities," Sustainability, vol. 9, No. 11, Nov. 1, 2017, 16 pages.

* cited by examiner

METHODS AND SYSTEMS FOR AN AFTERTREATMENT SYSTEM

CROSS REFERENCE TO RELATED APPLICATION

The present application claims priority to German patent application No. 102018206350.8, filed on Apr. 25, 2018. The entire contents of the above-listed application are hereby incorporated by reference for all purposes.

FIELD

The present disclosure relates to estimating emissions from a plurality of vehicles and adjusting engine operating parameters thereof to meet an emissions limit.

BACKGROUND/SUMMARY

In an effort to preserve the environment, manufacturers are continuously optimizing vehicle efficiency to decrease emissions. This relates, in particular, to emissions of nitrogen oxide and emissions of fine dust, which in the case of a regular loading may lead to localized concentrations. Therefore, the aim is avoid local high concentrations of emissions, which may include nitrogen oxides and carbon oxides.

For the purpose of reducing emissions of nitrogen oxide, motor vehicles, for example, motorcycles, passenger cars or trucks, are ordinarily equipped with one or more apparatuses for exhaust-gas aftertreatment. The exhaust-gas aftertreatment apparatuses may be, for example, lean $NO_x$ traps (LNT) and catalytic converters for selective catalytic reduction (SCR). The performance of such catalytic converters depends on, amongst other things, their size, their configuration with respect to the processing of noble metals, washcoats, etc., and the structure for control and regulation that is being used in this context. In this connection, one challenge amongst others consists in developing an optimal system with respect to costs that, at the same time, satisfies all regulations such as regulations in connection with emission limits. Ordinarily, such systems are developed to the effect that they satisfy defined approval prerequisites, in particular for specific applications.

The investigation is typically carried out with the aid of vehicle tests or engine tests, the focus being upon the overall results that are achieved, observed over a defined driving cycle with particular consideration of defined ranges within the cycle. One disadvantage of the existing investigative methods consists in the fact that they do not permit a quantification of emissions in connection with the traffic volume with respect to specific locations, in particular within a built-up area such as a city, for example.

One example approach for predicting emissions in a city are shown by Zheng et al. in US 2017/0285181 A1. Therein, a computer system is described that measures the speed of traffic on a road network. In this connection, the mean speed for each road segment is determined for defined time-slots. Another example approach is shown by Cho et al. in US 2015/0176456 A1. Therein, a model for an SCR catalytic converter and a method for correcting parameters of the SCR catalytic converter are described. In this case, the model may have been configured in such a way that concentrations of nitrogen oxide downstream of the SCR catalytic converter can be predicted with it.

However, the inventors have identified some issues with the approaches described above. For example, the previous examples do not factor in weather conditions which may adjust emissions within a region. Additionally, the region may comprise a plurality of vehicles producing different amounts of emissions. The previous examples do not provide a way to distribute the burden of meeting an emission target for a region among a plurality of vehicles selecting to do so.

In one example, the issues described above may be addressed by a system for an engine fluidly coupled to an exhaust passage housing an aftertreatment device. The system further comprising a controller with computer-readable instructions stored thereon that when executed enable the controller to estimate a total current emission output of all vehicles within a region and adjust engine operating parameters of a portion of all vehicles within the region if the total current emission output is greater than an emission target of the region. In this way, vehicle operators may select if they desire to assist in meeting the emission target, wherein engine operating parameters in their vehicles are adjusted when the emission target is overshot.

As one example, the portion of all vehicles in the region may comprise an electronic application configured to gather emission data from each individual vehicle on which it is installed. The emission data may be tabulated and an overall emission value of the portion of all vehicles in the region may be determined. The overall emission value may be used to estimate an emissions of a remaining portion of vehicles in the region without the electronic application. The two emissions values may be summed to determine the total current emission output. If the total current emission output is greater than the emission target, then engine operating parameters in the portion of all vehicles with the electronic application may be adjusted to decrease emissions therefrom.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 6:
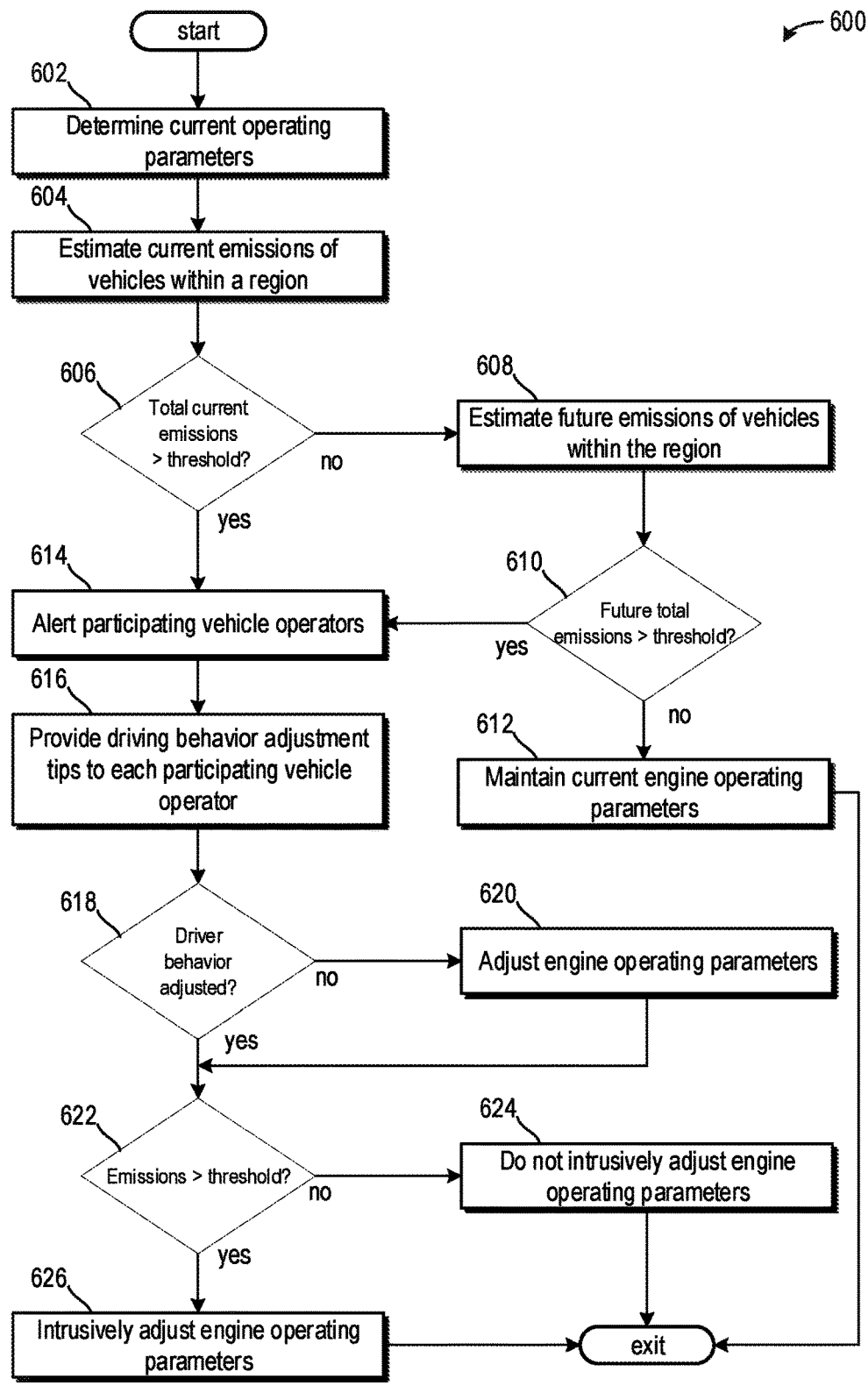
FIG. 6 shows a method for adjusting operating parameters of a vehicle in response to an emission target not being met.
Figure 7:
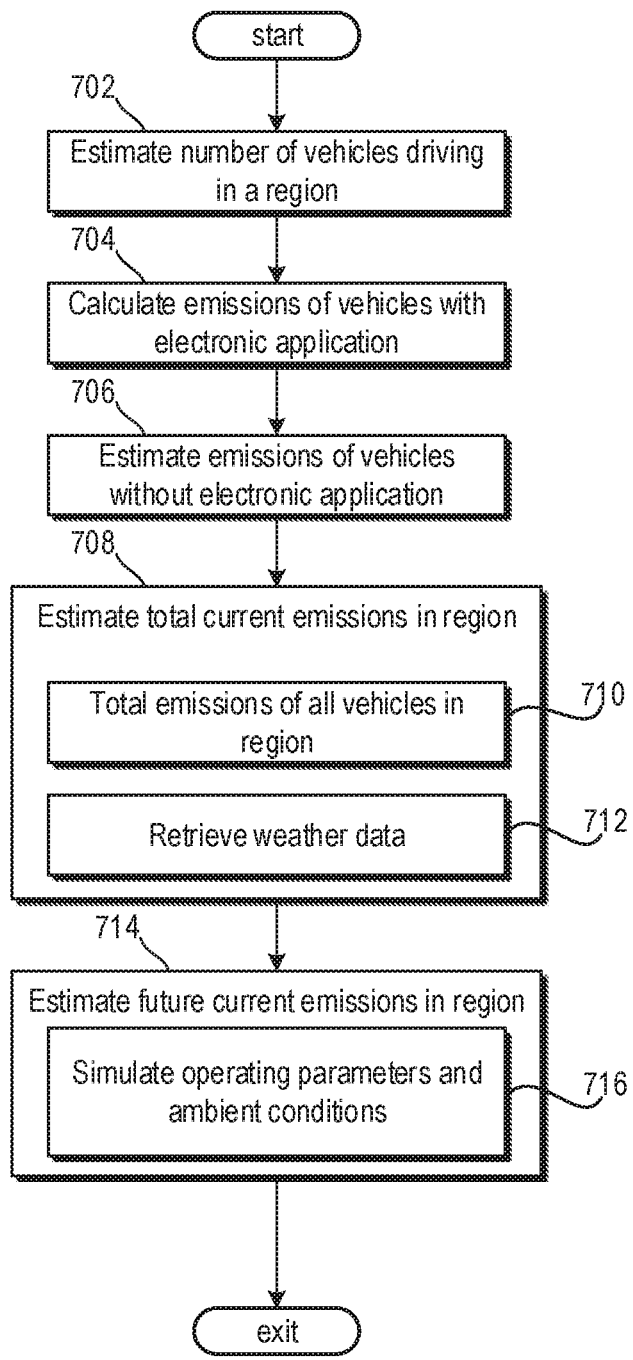
FIG. 7 shows a method for estimating current and future emissions in a region.

The following description relates to systems and methods for adjusting operating parameters of one or more vehicles in a region to decrease emissions therefrom to meet an emission target of the region. The one or more vehicles may comprise where vehicle operators of the one or more vehicles have selected to participate in meeting the emission target of the region, wherein meeting the emission target comprises where emissions from all the vehicles in the region are less than or equal to the emission target. FIGS. 1, 3-5 show examples of a vehicle which may comprise the electronic application which may be executed via a controller in an attempt to meet an emission target for a region. FIGS. 2, 6 and 7 show methods for adjusting engine operating parameters in response to the emission target not being met along with methods for estimating emissions within the region.

Herein, the present disclosure describes a method for adapting at least one operating parameter of an aftertreatment device of the exhaust gas of a motor vehicle, and also a corresponding control parameter of an engine of a motor vehicle to lower the local pollutant-emission loading by motor vehicles.

The apparatus for exhaust-gas aftertreatment that is used within the scope of the method according to the disclosure may include, for example, at least one catalytic converter. The exhaust-gas aftertreatment apparatus may also consist of at least one catalytic converter. The catalytic converter may be, for example, a lean $NO_x$ trap and/or an SCR catalytic converter and/or a particulate filter.

Speed progressions, for example, speed profiles, of a number of motor vehicles in the course of traveling within a defined spatial region or within a stipulated spatial zone, in particular in the course of traveling at least a defined route within the defined region, are generated for the defined region via a model. The speed progressions are communicated or transmitted to at least one model for simulating the operating parameters of a motor-vehicle engine and for simulating an apparatus for aftertreatment of the exhaust gas of the motor-vehicle engine. Via the model for simulating the operating parameters of the motor vehicle and for simulating the apparatus for exhaust-gas aftertreatment, the current emissions of each motor vehicle of the number of motor vehicles are determined, in particular for a defined route within the defined region.

The defined emissions are transmitted or communicated to an evaluating device, for example an optimizer. With the aid of the evaluating device, the emission quantity brought about or ejected by the number of motor vehicles, preferentially by all the motor vehicles, in the course of traveling within the defined region is ascertained, for instance calculated. The ascertained emission quantity is compared with a stipulated emission threshold value for the defined region. If the emission threshold value stipulated for the defined region is attained or exceeded, at least one operating parameter, for example, a setting of the apparatus for exhaust-gas aftertreatment, is adapted in such a way that the emission threshold value stipulated for the defined region value is fallen short of. The at least one adapted operating parameter of the apparatus for exhaust-gas aftertreatment is communicated to the model for simulating the operating parameters of the motor-vehicle engine and for simulating the apparatus for exhaust-gas aftertreatment. The communication can, for example, be undertaken with the aid of the evaluating device.

The method according to the disclosure has the advantage that it enables a local regulation of the emission loading, in particular in a manner depending on already existing emissions and on emissions caused by other motor vehicles. If the method is, for instance, used by a plurality of motor vehicles, then particularly in residential areas it is possible for the emission loadings caused by motor vehicles to be distinctly reduced, despite the presence of motor vehicles. This has, moreover, the advantage that motor-vehicle traffic remains possible even in cities, without the elevated emission loadings arising locally hitherto in this connection occurring.

In a variant, speed progressions of a number of motor vehicles for the defined region are generated via a model and/or an electronic application for simulating the traffic volume, in particular via a model for simulating the traffic volume in a built-up area. In this case, the model for simulating the traffic volume is configured to produce or to generate model data relating to various driving styles and/or to various traffic densities, and/or model data relating to the environment, for example, the presence of pedestrians, dogs and other living beings, and/or model data pertaining to traffic-signal switching cycles and/or data for mapping, in particular for charting, the environment, and/or to receive and to process said data, for instance to process said data within the scope of the model. The consideration of various driving styles, various traffic densities and the environment, and also of traffic-signal switching cycles and map material, has the advantage that the emission values arising can be simulated and estimated as realistically as possible.

The defined emissions may be emissions of nitrogen oxide and/or emissions of carbon dioxide and/or emissions of fine dust. For the individual types of emission in this connection, differing emission threshold values may have been stipulated in each instance.

In a further variant, the emission quantity brought about or ejected by the number of motor vehicles in the course of traveling within a stipulated region can be ascertained, preferentially calculated, via a model for a virtual reality or a virtual environment. The use of a model for a virtual reality has the advantage that a large number of realistic simulation options result by this method.

In the course of the ascertainment of the emission quantity brought about or ejected within the stipulated region, the spreading, that is to say, in particular, the mobility or progression, of the emitted molecules and/or particles in the air can be taken into consideration as a function of time. This has the advantage that a very realistic estimation of the emission loading in defined regions is possible in this way. In this connection, the current wind direction and/or diffusion properties of the molecules or particles in the air can be taken into consideration, in particular as input variables or parameters. The presence of precipitation and the type thereof can also be taken into consideration in this connection.

In an advantageous variant, all the motor vehicles taken into consideration within the scope of the simulation are assumed to be or regarded as motor vehicles with identical features. This has the advantage that the simulation optimizes the vehicle being considered with respect to the emission values thereof, without these being influenced by other vehicles in the region being considered.

On the basis of the operating parameters communicated to the model for simulating the operating parameters of the motor-vehicle engine and for simulating the apparatus for exhaust-gas aftertreatment, in an advantageous variant the emitted emission quantity is ascertained for a number of motor vehicles for a defined route within the defined region. Via the evaluating device, the emitted emission quantity is compared with a stipulated threshold value. In this way, it is possible to take into consideration the real emission values of the motor vehicles involved and, as a result, also really to fall short of stipulated emission limits.

In an advantageous variant, the defined emission quantity is communicated or transmitted to an apparatus for visualizing the emission quantity in at least one defined region.

Moreover, a corresponding visual representation can be output, for example to an external server or to a display apparatus. This enables the visualization of the ascertained emission quantity in at least one defined region, preferentially in a large number of regions. As a result, the adaptation of the operating parameters of the motor vehicles can continue to be optimized with regard to the local diminution of pollutant emissions.

In a further variant, if an unintended, for example, an incorrect or inaccurate outcome, result is observed or detected, at least one boundary condition can be set, for example, manually set or changed, in the evaluating device. The boundary condition may be, for example, a restriction or limitation of one or more parameters. The possibility of the setting and hence the adaptation of boundary conditions has the advantage that obvious errors can be corrected and eliminated in simple and rapid manner.

The control apparatus according to the disclosure for adapting at least one operating parameter of an apparatus for aftertreatment of the exhaust gas of a motor vehicle includes a device for generating speed progressions of a number, preferentially a plurality or large number, of motor vehicles in the course of traveling within a defined region, for example in the course of traveling at least a defined route within the defined region, via a model. The control apparatus includes, in addition, a device for determining the current emissions of each motor vehicle of the number of motor vehicles via a model or electronic application for simulating the operating parameters of the motor-vehicle engine and for simulating the apparatus for exhaust-gas aftertreatment.

Over and above this, the control apparatus includes an evaluating device. The evaluating device is configured to ascertain, in particular to calculate, the emission quantity brought about by the number of motor vehicles in the course of traveling within the stipulated region. Over and above this, the evaluating device is configured to compare the ascertained emission quantity with a stipulated emission threshold value for the defined region. The control device includes, in addition, a device for adapting at least one operating parameter, for instance, at least one setting, of the apparatus for exhaust-gas aftertreatment. The control apparatus is configured to execute a method according to the disclosure as described above.

The control apparatus may include a device for generating a virtual environment. The device for generating speed progressions via a model may have been configured for receiving data from, and for outputting data to, the device for generating a virtual environment, and for outputting data relating to the speed of a number of motor vehicles to the device for determining the current emissions.

In a further variant, the control apparatus includes a device for generating a virtual environment, and the device for determining the current emissions is configured for receiving data relating to the speed of a number of motor vehicles from the device for generating speed progressions via a model, and for receiving data relating to catalytic-converter parameters from the evaluating device, and for outputting data to the device for generating a virtual environment.

In an advantageous variant, the control apparatus includes a device for generating a virtual environment and a device for visualizing the emission quantity in at least one defined region. In this case, the device for generating a virtual environment is configured for receiving data from, and for outputting data to, the device for generating speed progressions via a model, and for receiving data from the device for determining the current emissions, and for outputting data to the evaluating device and/or the device for visualizing the emission quantity.

In a further variant, the control apparatus includes a device for generating a virtual environment, and the evaluating device is configured for receiving data from the device for determining the current emissions, and for receiving data from the device for generating a virtual environment, in particular relating to emission values of all the motor vehicles with respect to at least one defined zone or one defined region. In this variant, the evaluating device is configured, in addition, for outputting data relating to operating parameters of the apparatus for exhaust-gas aftertreatment to the device for determining the current emissions.

All the aforementioned variants of the configuration of the control apparatus have the advantage that they enable an efficient and meaningful interaction of the devices that are present within the framework of the control apparatus.

The motor vehicle according to the disclosure includes an internal-combustion engine and at least one apparatus for exhaust-gas aftertreatment, for example at least one catalytic converter such as, for example, an SCR catalytic converter or a lean $NO_x$ trap. The motor vehicle according to the disclosure includes, in addition, a previously described control apparatus according to the disclosure. The motor vehicle according to the disclosure may be, for example, a passenger car, a truck or a motorcycle. The motor vehicle according to the disclosure has the same advantages as the method according to the disclosure described above and the described control apparatus according to the disclosure. Said motor vehicle has, in particular, the advantage that it is capable of influencing the pollutant emissions locally and, under defined preconditions, of reducing them selectively.

The disclosure will be elucidated in more detail in the following on the basis of embodiments with reference to the appended figures. Although the disclosure will be illustrated and described in detail by the preferred embodiments, the disclosure is not restricted by the disclosed examples, and other variations may be derived therefrom by a person skilled in the art without departing from the scope of protection of the disclosure.

Figure 3:
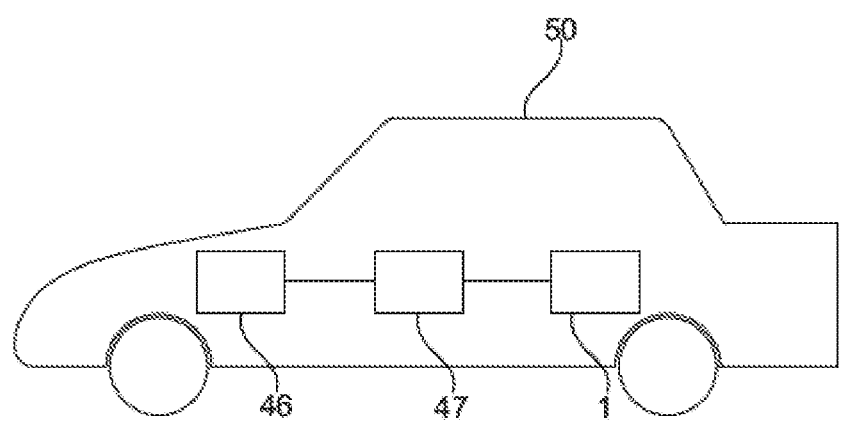
FIG. 3 shows schematically a motor vehicle.
Figure 4:
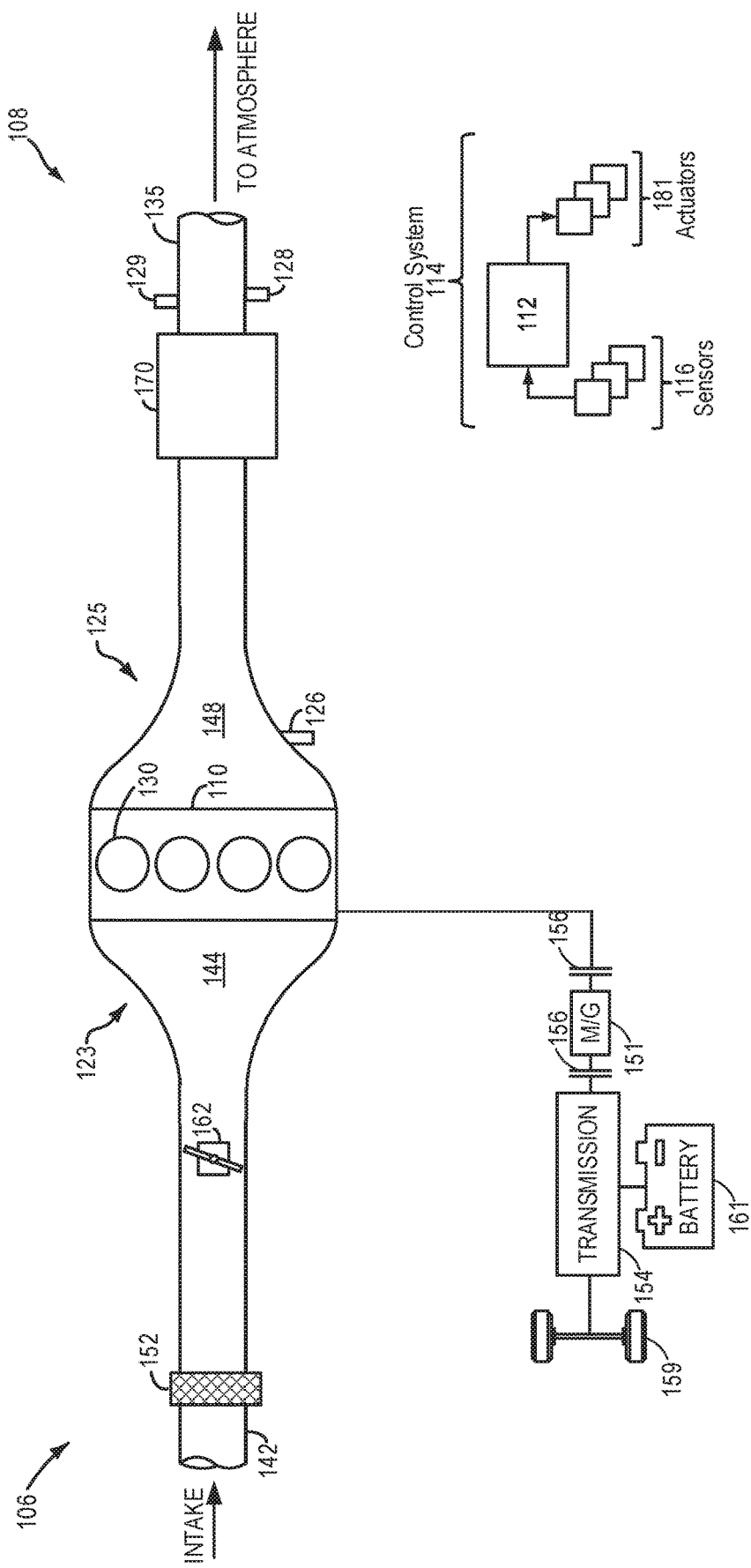
FIG. 4 shows an engine of a hybrid vehicle.
Figure 5:
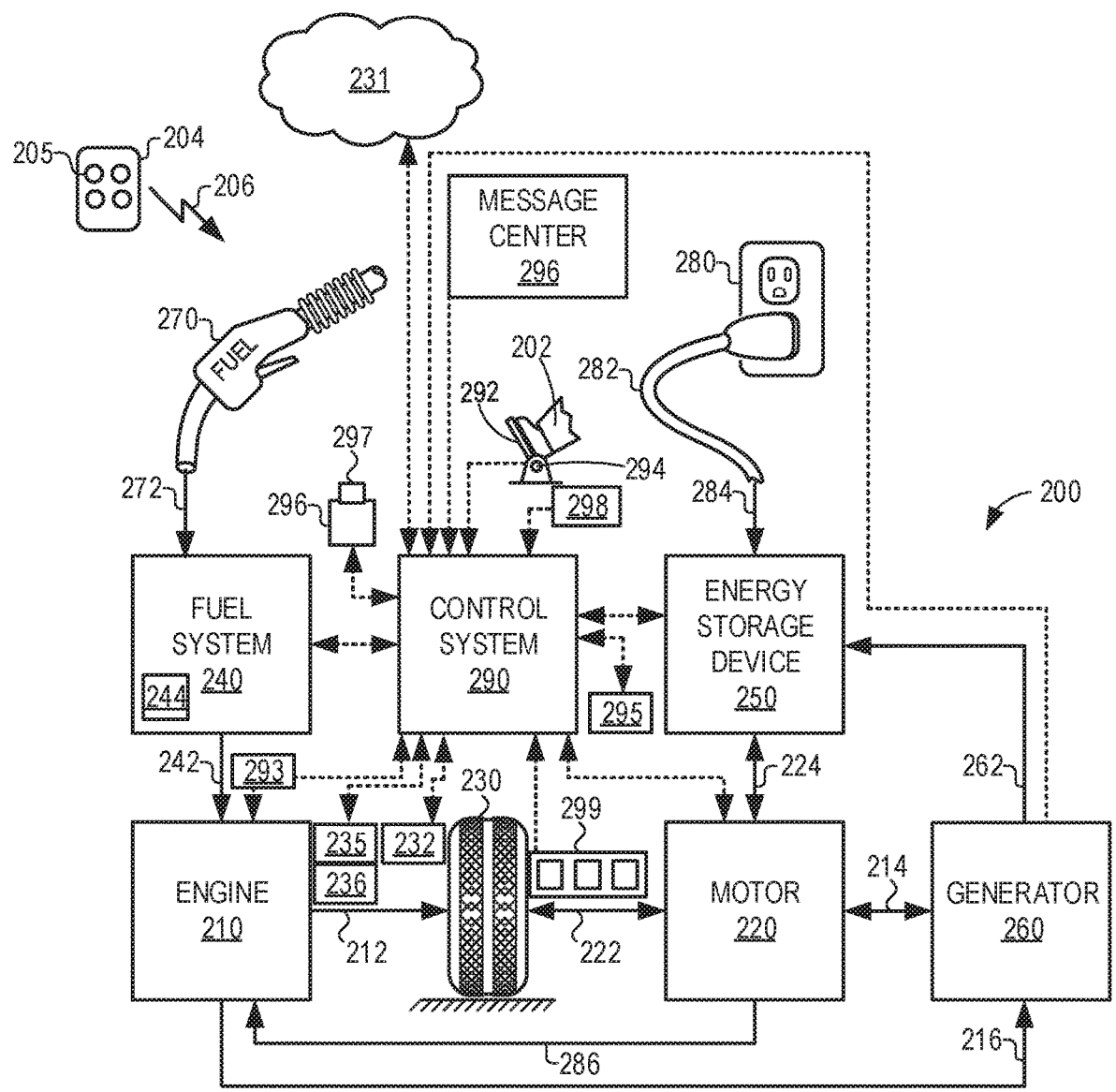
FIG. 5 schematically shows an example vehicle propulsion system.

FIGS. 3-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

Figure 1:
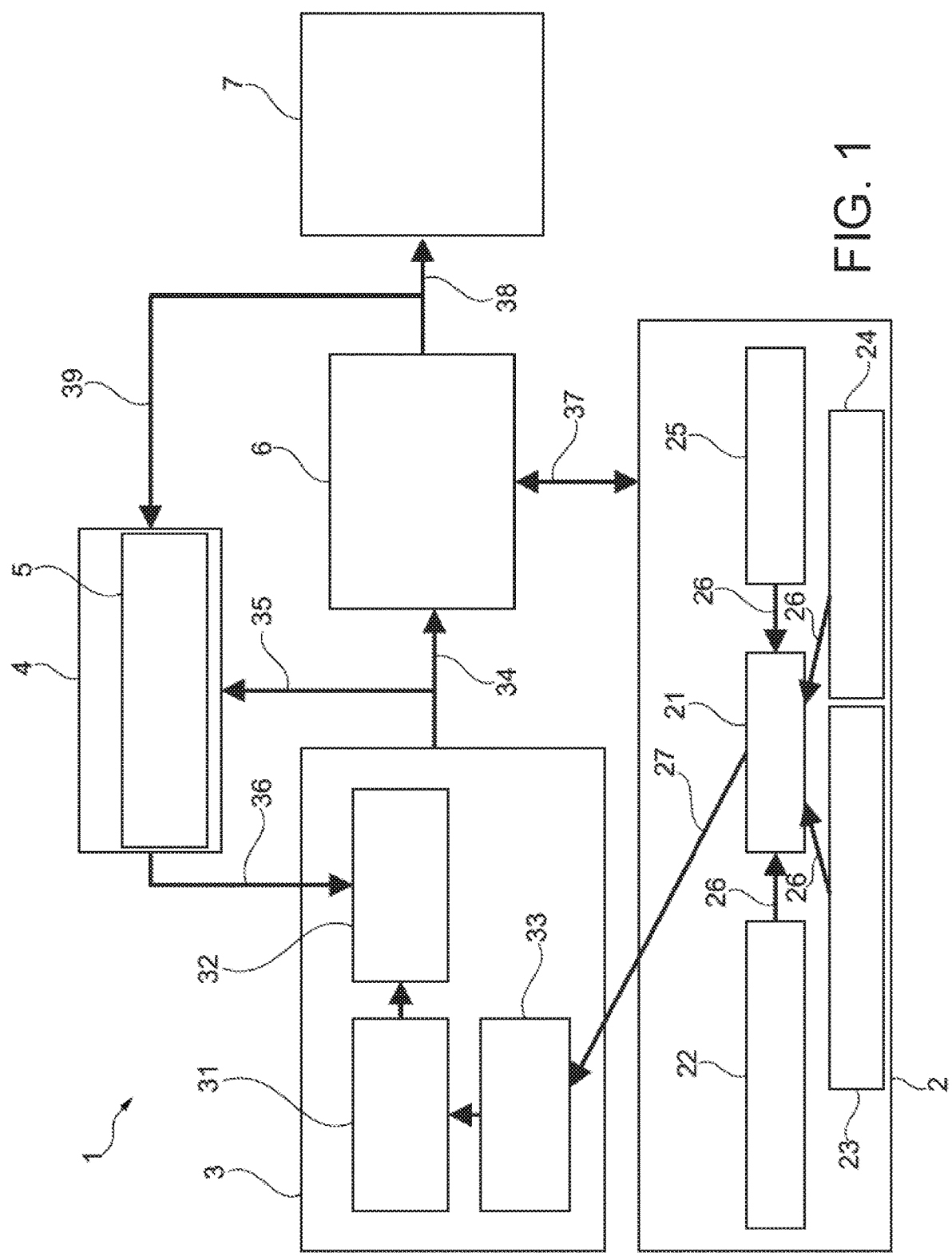
FIG. 1 shows schematically a control apparatus.
Figure 2:
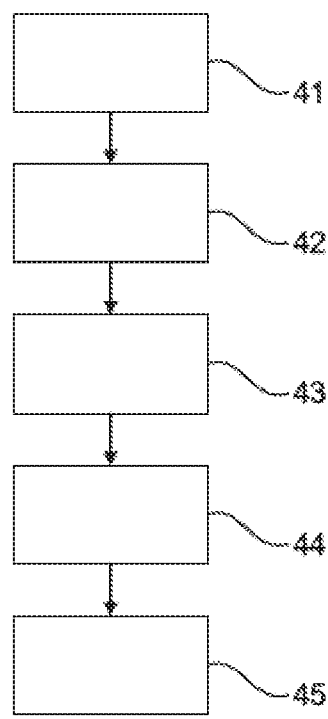
FIG. 2 shows schematically a method for estimating emissions in a region.

The control apparatus 1 according to the disclosure includes, in the variant shown in FIG. 1, a device 2 for generating speed progressions of a number of motor vehicles in the course of traveling within a defined region via a model 21. The model 21 may be, in particular, a model for simulating the traffic volume. Within the scope of the simulation model 21, a plurality of models may be generated, including a model 24 for simulating traffic-signal switching cycles, a model 22 for generating or taking into consideration various driving styles and/or traffic densities, a model 23 for simulating the environment, in particular, for simulating pedestrians, dogs or other living beings that are present, and also a model 25 for mapping or charting, or for visual representation of, the environment in the form of a map may be taken into consideration. The stated models may have been configured as separate devices or apparatuses 22, 23, 24 and 25; they can transmit data to the simulation model 21. This is represented in FIG. 1 by arrows 26.

Additionally or alternatively, the model 21 may be interchangeably referred to as an electronic application executable as instructions stored on non-transitory memory of a controller (such as controller 112 of FIG. 4 or control system 290 of FIG. 5, which may be used similarly to control apparatus 1).

The control apparatus according to the disclosure includes, in addition, a device 3 for determining the current emissions of each vehicle of the number of motor vehicles. The device 3 for determining the current emissions is configured to have speed progressions communicated to it from the device 2 for generating speed progressions for various vehicles. This is represented by an arrow 27.

The device 3 for determining the current emissions is configured for using a model 31 for simulating the operating parameters of the motor-vehicle engine, and a model 32 for simulating an apparatus for exhaust-gas aftertreatment, and also a model 33 for simulating the speed and/or the load of the engine. These models 31, 32 and 33 exchange data with one another.

In this connection, various simulation technologies may find application, for example XiL (X-in-the-loop). X in this connection denotes a model, software or hardware of an open-loop and closed-loop control system in the test, with XiL standing for MiL (model-in-the-loop), SiL (software-in-the-loop) or HiL (hardware-in-the-loop) test environments.

The control apparatus 1 according to the disclosure includes, in addition, an evaluating device 4. The evaluating device 4 is configured to receive data from the device 3 for determining the current emissions. This is labeled by an arrow 35. The evaluating device 4 is, in addition, configured to communicate data relating to parameters of the apparatus for exhaust-gas aftertreatment, in particular relating to the magnitude thereof, PGM, etc., to the device 3 for determining the current emissions. This is labeled by an arrow 36. Data communicated by device 3 to the evaluating device 4 are real emission values from various vehicles with respect to their route traveled. The evaluating device 4 is, in addition, configured to ascertain, for example, to calculate, the emission quantities brought about by the number of motor vehicles in the course of traveling within the defined region, and to compare the ascertained emission quantity with a stipulated emission threshold value for the defined region The control apparatus 1 according to the disclosure includes, in addition, a device 5 for adapting at least one operating parameter of the apparatus for exhaust-gas aftertreatment. In the variant shown, the device 5 for adapting at least one operating parameter is an integral part of the evaluating device 4.

Optionally, the apparatus 1 according to the disclosure includes, in addition, a device 6 for generating a virtual environment. It may be a question of appropriate hardware and/or appropriate software. The device 6 for generating a virtual environment is configured to receive data from the device 3 for determining the current emissions. This is labeled by an arrow 34. The device 6 for generating a virtual environment is, over and above this, configured to receive data from the device 2 for generating speed progressions and to communicate data to said device. This is labeled by an arrow 37.

Optionally furthermore, the control apparatus 1 according to the disclosure may include a device 7 for visualizing the emission quantity in at least one defined region. This device is configured for receiving data from the device 6 for generating a virtual environment. This is labeled by an arrow 38. Via the device 7 for visualizing the emission quantity, emission loadings with respect to defined regions can be displayed, for instance in the form of corresponding maps, and output.

The device 6 for generating a virtual environment is, moreover, configured to communicate data to the evaluating device 4. It is a question, for instance, of emission values with respect to defined regions, which were caused by all the motor vehicles located there and were ascertained via the device 6 for generating a virtual environment. This is labeled by an arrow 39. Within the scope of the evaluating device 4, these data can be taken into consideration in the ascertainment of the emission quantity.

FIG. 2 shows schematically a method according to the disclosure in the form of a flowchart. The method relates to the adapting of at least one operating parameter of an apparatus for aftertreatment, for example, at least one catalytic converter, of the exhaust gas of a motor vehicle.

In step 41, speed progressions of a number of motor vehicles in the course of traveling within a defined region are generated for the defined region via a model and communicated to a model for simulating the operating parameters of the motor vehicle and for simulating an apparatus for aftertreatment of the exhaust gas of the motor-vehicle engine. In FIG. 1 this corresponds to arrow 27.

In step 42, via a model for simulating the operating parameters of the motor-vehicle engine and for simulating the apparatus for exhaust-gas aftertreatment, the current emissions of each motor vehicle of the number of motor vehicles are determined, and the predicted emissions are communicated to an evaluating device 4, for example an optimizer. In FIG. 1 this corresponds to case 35.

In step 43, with the aid of the evaluating device the emissions brought about by the number of motor vehicles in the course of traveling within the stipulated region (e.g., the ejected emission quantity) are/is ascertained, calculated, and the ascertained emission quantity is compared with a stipulated threshold value for the defined region. In FIG. 1 this step is executed within the evaluating device 4, for example via device 5.

In step 44, at least one operating parameter of the apparatus for exhaust-gas aftertreatment is adapted in such a way that, if the emission threshold value stipulated for the defined region is attained or exceeded, said emission threshold value is fallen short of. In FIG. 1 this step is executed by device 5. In step 45, the at least one adapted operating parameter of the apparatus for exhaust-gas aftertreatment is communicated to the model for simulating the operating parameters of the motor-vehicle engine and to the model for simulating the apparatus for exhaust-gas aftertreatment. In FIG. 1 this corresponds to case 36.

FIG. 3 shows schematically a motor vehicle according to the disclosure. The motor vehicle 50 according to the disclosure, which may be a passenger car, a truck or a motorcycle, includes an internal-combustion engine 46 and an apparatus 47 for exhaust-gas aftertreatment. The apparatus 47 for exhaust-gas aftertreatment may include, for example, at least one catalytic converter, in particular a lean $NO_x$ trap and/or an SCR catalytic converter and/or a particulate filter. The apparatus 47 for exhaust-gas aftertreatment is configured to aftertreat the exhaust gas generated by the internal-combustion engine 46. The motor vehicle 50 according to the disclosure includes, in addition, a control apparatus 1 previously described, in particular in connection with FIG. 1. This control apparatus 1 is configured for executing a method according to the disclosure and, in particular, for adapting at least one operating parameter of the apparatus 47 for exhaust-gas aftertreatment.

FIG. 4 shows a schematic depiction of a hybrid vehicle system 106 that can derive propulsion power from engine system 108 and/or an on-board energy storage device. An energy conversion device, such as a generator, may be operated to absorb energy from vehicle motion and/or engine operation, and then convert the absorbed energy to an energy form suitable for storage by the energy storage device.

Engine system 108 may include an engine 110 having a plurality of cylinders 130. Engine 110 includes an engine intake 123 and an engine exhaust 125. Engine intake 123 includes an air intake throttle 162 fluidly coupled to the engine intake manifold 144 via an intake passage 142. Air may enter intake passage 142 via air filter 152. Engine exhaust 125 includes an exhaust manifold 148 leading to an exhaust passage 135 that routes exhaust gas to the atmosphere. Engine exhaust 125 may include one or more emission control devices 170 mounted in a close-coupled position or in a far underbody position. The one or more emission control devices may include a three-way catalyst, lean $NO_x$ trap, diesel particulate filter, oxidation catalyst, etc. It will be appreciated that other components may be included in the engine such as a variety of valves and sensors, as further elaborated in herein. In some embodiments, wherein engine system 108 is a boosted engine system, the engine system may further include a boosting device, such as a turbocharger (not shown).

Vehicle system 106 may further include control system 114. Control system 114 is shown receiving information from a plurality of sensors 116 (various examples of which are described herein) and sending control signals to a plurality of actuators 181 (various examples of which are described herein). As one example, sensors 116 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 106. As another example, the actuators may include the throttle 162.

Controller 112 may be configured as a conventional microcomputer including a microprocessor unit, input/output ports, read-only memory, random access memory, keep alive memory, a controller area network (CAN) bus, etc. Controller 112 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

In some examples, hybrid vehicle 106 comprises multiple sources of torque available to one or more vehicle wheels 159. In other examples, vehicle 106 is a conventional vehicle with only an engine, or an electric vehicle with only electric machine(s). In the example shown, vehicle 106 includes engine 110 and an electric machine 151. Electric machine 151 may be a motor or a motor/generator. A crankshaft of engine 110 and electric machine 151 may be connected via a transmission 154 to vehicle wheels 159 when one or more clutches 156 are engaged. In the depicted example, a first clutch 156 is provided between a crankshaft and the electric machine 151, and a second clutch 156 is provided between electric machine 151 and transmission 154. Controller 112 may send a signal to an actuator of each clutch 156 to engage or disengage the clutch, so as to connect or disconnect crankshaft from electric machine 151 and the components connected thereto, and/or connect or disconnect electric machine 151 from transmission 154 and the components connected thereto. Transmission 154 may be a gearbox, a planetary gear system, or another type of transmission. The powertrain may be configured in various manners including as a parallel, a series, or a series-parallel hybrid vehicle.

Electric machine 151 receives electrical power from a traction battery 161 to provide torque to vehicle wheels 159. Electric machine 151 may also be operated as a generator to provide electrical power to charge battery 161, for example during a braking operation.

FIG. 5 illustrates an example vehicle propulsion system 200 which may be used similarly to hybrid vehicle system 106 of FIG. 4. Vehicle propulsion system 200 includes a fuel burning engine 210 and a motor 220. As a non-limiting example, engine 210 comprises an internal combustion engine and motor 220 comprises an electric motor. Engine 210 may be used substantially similarly to engine 110 of FIG. 4 and motor 220 may be used similarly to electric machine 151 of FIG. 4. Motor 220 may be configured to utilize or consume a different energy source than engine 210. For example, engine 210 may consume a liquid fuel (e.g., gasoline) to produce an engine output while motor 220 may consume electrical energy to produce a motor output. As such, a vehicle with propulsion system 200 may be referred to as a hybrid electric vehicle (HEV).

Vehicle propulsion system 200 may utilize a variety of different operational modes depending on operating conditions encountered by the vehicle propulsion system. Some of these modes may enable engine 210 to be maintained in an off state (e.g., set to a deactivated state) where combustion of fuel at the engine is discontinued. For example, under select operating conditions, motor 220 may propel the vehicle via drive wheel 230 as indicated by arrow 222 while engine 210 is deactivated, which may herein be referred to as an electric-only operation.

In another example, the engine may be equipped with a start/stop (S/S) feature 293, wherein the engine 210 may be automatically shut down during times when the vehicle is not moving, or when the vehicle speed is below a threshold speed, when engine speed is below a threshold engine speed, etc. Control system 290 may be connected to engine 210 and S/S feature 293, for performing the start-stop functions. Control system 290 may be used similarly to controller 112 of FIG. 4 and/or device 2 of FIG. 1. Advantages to the S/S functionality may include an improvement in fuel economy over other vehicles that do not employ such technology. During the start/stop the vehicle may be propelled via its momentum and not by the engine 210 or the motor 220.

Herein, "automatically" executing various vehicle features, such as S/S, refers to execution of the various features without vehicle operator input. That is to say, the vehicle operator does not directly signal or request the S/S or other automatic features to be executed. As such, automatic features are automatically executed in a response to current operating conditions and may not be directly signaled by the operator.

During other operating conditions, engine 210 may be set to a deactivated state (as described above) while motor 220 may be operated to charge energy storage device 250. For example, motor 220 may receive wheel torque from drive wheel 230 as indicated by arrow 222 where the motor may convert the kinetic energy of the vehicle to electrical energy for storage at energy storage device 250 as indicated by arrow 224. This operation may be referred to as regenerative braking of the vehicle. Thus, motor 220 can provide a generator function in some examples. However, in other examples, generator 260 may instead receive wheel torque from drive wheel 230, where the generator may convert the kinetic energy of the vehicle to electrical energy for storage at energy storage device 250 as indicated by arrow 262. In some examples, the engine 210 may deactivate during regenerative braking and traction at the drive wheel 230 may be negative, such that the motor 220 may spin in reverse and recharge the energy storage device 250. Thus, regenerative braking may be distinguished from an electric-only operation, where the motor 220 may provide positive traction at the drive wheel 230, thereby decreasing a SOC of the energy storage device 250 while the engine 210 is deactivated.

During still other operating conditions, engine 210 may be operated by combusting fuel received from fuel system 240 as indicated by arrow 242. For example, engine 210 may be operated to propel the vehicle via drive wheel 230 as indicated by arrow 212 while motor 220 is deactivated, such as during a charge-sustaining operation. During other operating conditions, both engine 210 and motor 220 may each be operated to propel the vehicle via drive wheel 230 as indicated by arrows 212 and 222, respectively. A configuration where both the engine and the motor may selectively propel the vehicle may be referred to as a parallel type vehicle propulsion system or a hybrid propulsion. Note that in some examples, motor 220 may propel the vehicle via a first set of drive wheels and engine 210 may propel the vehicle via a second set of drive wheels.

In other examples, vehicle propulsion system 200 may be configured as a series type vehicle propulsion system, whereby the engine does not directly propel the drive wheels. Rather, engine 210 may be operated by power motor 220, which may in turn propel the vehicle via drive wheel 230 as indicated by arrow 222. For example, during select operating conditions, engine 210 may drive generator 260 as indicated by arrow 216, which may in turn supply electrical energy to one or more of motor 220 as indicated by arrow 214 or energy storage device 250 as indicated by arrow 262. As another example, engine 210 may be operated to drive motor 220 which may in turn provide a generator function to convert the engine output to electrical energy, where the electrical energy may be stored at energy storage device 250 for later use by the motor.

In still other examples, which will be discussed in further detail below, motor 220 may be configured to rotate engine unfueled in a forward (e.g. default orientation) or reverse orientation, using energy provided via energy storage device 250, exemplified by arrow 286.

Fuel system 240 may include one or more fuel storage tanks 244 for storing fuel on-board the vehicle. For example, fuel tank 244 may store one or more liquid fuels, including but not limited to: gasoline, diesel, and alcohol fuels. In some examples, the fuel may be stored on-board the vehicle as a blend of two or more different fuels. For example, fuel tank 244 may be configured to store a blend of diesel and biodiesel, gasoline and ethanol (e.g., E10, E85, etc.) or a blend of gasoline and methanol (e.g., M10, M85, etc.), whereby these fuels or fuel blends may be delivered to engine 210 as indicated by arrow 242. Still other suitable fuels or fuel blends may be supplied to engine 210, where they may be combusted at the engine to produce an engine output. The engine output may be utilized to propel the vehicle as indicated by arrow 212 or to recharge energy storage device 250 via motor 220 or generator 260.

In some examples, energy storage device 250 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 250 may include one or more batteries and/or capacitors. In some examples, increasing the electrical energy supplied from the energy storage device 250 may decrease an electric-only operation range, as will be described in greater detail below.

Control system 290 may communicate with one or more of engine 210, motor 220, fuel system 240, energy storage device 250, and generator 260. Control system 290 may receive sensory feedback information from one or more of engine 210, motor 220, fuel system 240, energy storage device 250, and generator 260. Further, control system 290 may send control signals to one or more of engine 210, motor 220, fuel system 240, energy storage device 250, and generator 260 responsive to this sensory feedback. In some examples, control system 290 may receive an indication of an operator requested output of the vehicle propulsion system from a vehicle operator 202. For example, control system 290 may receive sensory feedback from pedal position sensor 294 which communicates with pedal 292. Pedal 292 may refer schematically to a brake pedal and/or an accelerator pedal. Furthermore, in some examples control system 290 may be in communication with a remote engine start receiver 295 (or transceiver) that receives wireless signals 206 from a key fob 204 having a remote start button 205. In other examples (not shown), a remote engine start may be initiated via a cellular telephone, or smartphone based system where a user's cellular telephone sends data to a server and the server communicates with the vehicle to start the engine.

In some examples, additionally or alternatively, the vehicle propulsion system 200 may be configured to operate autonomously (e.g., without a human vehicle operator). As such, the control system 290 may determine one or more desired operating engine conditions based on estimated current driving conditions.

Energy storage device 250 may periodically receive electrical energy from a power source 280 residing external to the vehicle (e.g., not part of the vehicle) as indicated by arrow 284. As a non-limiting example, vehicle propulsion system 200 may be configured as a plug-in hybrid electric vehicle (HEV), whereby electrical energy may be supplied to energy storage device 250 from power source 280 via an electrical energy transmission cable 282. During a recharging operation of energy storage device 250 from power source 280, electrical transmission cable 282 may electrically couple energy storage device 250 and power source 280. While the vehicle propulsion system is operated to propel the vehicle, electrical transmission cable 282 may disconnect between power source 280 and energy storage device 250. Control system 290 may identify and/or control the amount of electrical energy stored at the energy storage device, which may be referred to as the state of charge (SOC).

In other examples, electrical transmission cable 282 may be omitted, where electrical energy may be received wirelessly at energy storage device 250 from power source 280. For example, energy storage device 250 may receive electrical energy from power source 280 via one or more of electromagnetic induction, radio waves, and electromagnetic resonance. As such, it should be appreciated that any suitable approach may be used for recharging energy storage device 250 from a power source that does not comprise part of the vehicle. In this way, motor 220 may propel the vehicle by utilizing an energy source other than the fuel utilized by engine 210.

Fuel system 240 may periodically receive fuel from a fuel source residing external to the vehicle. As a non-limiting example, vehicle propulsion system 200 may be refueled by receiving fuel via a fuel dispensing device 270 as indicated by arrow 272. In some examples, fuel tank 244 may be configured to store the fuel received from fuel dispensing device 270 until it is supplied to engine 210 for combustion. In some examples, control system 290 may receive an indication of the level of fuel stored at fuel tank 244 via a fuel level sensor. The level of fuel stored at fuel tank 244 (e.g., as identified by the fuel level sensor) may be communicated to the vehicle operator, for example, via a fuel gauge or indication in a vehicle instrument panel 296.

The vehicle propulsion system 200 may also include an ambient temperature/humidity sensor 298, and a roll stability control sensor, such as a lateral and/or longitudinal and/or yaw rate sensor(s) 299. The vehicle instrument panel 296 may include indicator light(s) and/or a text-based display in which messages are displayed to an operator. The vehicle instrument panel 296 may also include various input portions for receiving an operator input, such as buttons, touch screens, voice input/recognition, etc. For example, the vehicle instrument panel 296 may include a refueling button 297 which may be manually actuated or pressed by a vehicle operator to initiate refueling. For example, as described in more detail below, in response to the vehicle operator actuating refueling button 297, a fuel tank in the vehicle may be depressurized so that refueling may be performed.

Control system 290 may be communicatively coupled to other vehicles or infrastructures using appropriate communications technology, as is known in the art. For example, control system 290 may be coupled to other vehicles or infrastructures via a wireless network 231, which may comprise Wi-Fi, Bluetooth, a type of cellular service, a wireless data transfer protocol, and so on. Control system 290 may broadcast (and receive) information regarding vehicle data, vehicle diagnostics, traffic conditions, vehicle location information, vehicle operating procedures, etc., via vehicle-to-vehicle (V2V), vehicle-to-infrastructure-to-vehicle (V2I2V), and/or vehicle-to-infrastructure (V2I or V2X) technology. The communication and the information exchanged between vehicles can be either direct between vehicles, or can be multi-hop. In some examples, longer range communications (e.g. WiMax) may be used in place of, or in conjunction with, V2V, or V2I2V, to extend the coverage area by a few miles. In still other examples, vehicle control system 290 may be communicatively coupled to other vehicles or infrastructures via a wireless network 231 and the internet (e.g. cloud), as is commonly known in the art. One example of a V2V communication device may include dedicated-short-range-communication (DSRC) network which may allow vehicles within a threshold proximity (e.g., 5,000 feet) to communicate (e.g., transfer information) free of an internet connection.

Vehicle system 200 may also include an on-board navigation system 232 (for example, a Global Positioning System) that an operator of the vehicle may interact with. The navigation system 232 may include one or more location sensors for assisting in estimating vehicle speed, vehicle altitude, vehicle position/location, etc. This information may be used to infer engine operating parameters, such as local barometric pressure. As discussed above, control system 290 may further be configured to receive information via the internet or other communication networks. Information received from the GPS may be cross-referenced to information available via the internet to determine local weather conditions, local vehicle regulations, etc.

In some examples, vehicle propulsion system 200 may include one or more onboard cameras 235. Onboard cameras 235 may communicate photos and/or video images to control system 290, for example. Onboard cameras may in some examples be utilized to record images within a predetermined radius of the vehicle, for example. The onboard cameras 235 may be arranged on an exterior surface of the vehicle so that an area surrounding and/or adjacent to the vehicle may be visualized.

Controller 112 may be configured as a conventional microcomputer including a microprocessor unit, input/output ports, read-only memory, random access memory, keep alive memory, a controller area network (CAN) bus, etc. Controller 112 may be configured as a powertrain control module (PCM). The controller may be shifted between sleep and wake-up modes for additional energy efficiency. The controller may receive input data from the various sensors, process the input data, and trigger the actuators in response to the processed input data based on instruction or code programmed therein corresponding to one or more routines.

Turning now to FIG. 6, it shows a method 600 for estimating a total emission value for a plurality of vehicles in a region and adjusting engine operating parameters in response to the total emission value. Instructions for carrying out method 600 and the rest of the methods included herein may be executed by a controller based on instructions stored on a memory of the controller and in conjunction with signals received from sensors of the engine system, such as the sensors described above with reference to FIG. 4. The controller may employ engine actuators of the engine system to adjust engine operation, according to the methods described below.

The method 600 begins at 602, which includes determining current operating parameters. The current operating parameters may include, but are not limited to, one or more of a manifold vacuum, throttle position, engine speed, vehicle speed, engine temperature, exhaust gas temperature, catalyst temperature, and air/fuel ratio.

The method 600 proceeds to 604, which includes estimating a current emissions of vehicles within a region. The region may be defined as an area with a threshold radius and/or a threshold width. For example, the threshold radius may be 100, 1000, 2000, or 5000 meters. In some examples, additionally or alternatively, the region may be an amount of square kilometers or feet. Additionally or alternatively, the region may correspond to a zip code, city limits, country borders, state borders, and the like. Additionally or alternatively, the region may correspond to a fixed location, such as of a school, shopping mall, urban area, stadium, neighborhood, park, and the like. In this way, a city may comprise multiple "regions" with each of the regions comprising different emission targets. For example, an emission target near a school or hospital may be lower than an emission target near a rural area.

The current emissions of vehicles within the region may correspond to a total current emission of all the vehicles within the region. In one example, the method 600 is implemented by an electronic application programmed into non-transitory memory of a controller, such as the controller of FIG. 4. The electronic application may be arranged on a plurality of vehicles of all the vehicles within the region. As such, the plurality of vehicles of all the vehicles may only be a portion of all the vehicles. In this way, a remaining portion of the vehicles may not comprise the electronic application. An individual emission from each vehicle comprising the electronic application may be calculated. The individual emissions of each of the vehicles may be used to estimate emissions for other vehicles that do not comprise the electronic application. The emissions may be summed to estimate the total current emission in the region.

In one example, for vehicles that are free of and od not comprise the electronic application, their emissions may be estimated based on road conditions including a speed limit, traffic lights, number of pedestrians, and the like. Their emissions may further be estimated based on emissions from similar vehicles comprising the electronic application. For example, emissions from a sedan with the electronic application may be used to estimate emissions from a sedan without the electronic application. Conversely, emissions from a passenger truck with the electronic application may be used to estimate emissions from a passenger truck without the electronic application. In some examples, additionally or alternatively, an average emission may be calculated, the average emission being equal to an average emission emitted by the vehicles with the electronic application. The average emission may be used to estimate emissions of vehicles without the electronic application.

A total number of vehicles in the region may be estimated based on traffic data corresponding to the region. Additionally or alternatively, the total number of vehicles may be estimated based on cameras arranged onboard vehicles with the electronic application, wherein feedback from the cameras may be extrapolated with data regarding to a time of day, weather, and the like to estimate a total number of vehicles within the region.

In this way, the vehicles with the electronic application may be communication with one another via a wireless network, dedicated short-range communication network, or the like. In one example, the dedicated short-range communication network may have a range corresponding to a size of the region. In this way, vehicles in separate regions may be blocked from communicating with one another. Communication over the wireless network may include a vehicle with the electronic application communicating with a central server, wherein the information may be relayed to other vehicles with the electronic application in the region. In some examples, additionally or alternatively, the central server may be configured to store data in a multi-input look-up table, wherein the data corresponds to emissions in a region with inputs including weather, road speed limit, road congestion, pedestrian traffic, and the like.

The method 600 proceeds to 606 to determine if the total current emissions are greater than a total region emission threshold. The total current emissions may be equal to emissions of vehicles within the region. The total region emission threshold may be based on an emission target of the region, wherein the emission target of the region may be adjusted based on a location of the region, weather, and the like. For example, the emission target may be decreased if the weather is windy and the wind is bringing emissions from a different region to the region. Alternatively, if winds are carrying emissions out of the region to a different region, then the emission target may be increased. As another example, an emission target near a hospital may be less than an emission target near a neighborhood or rural area. Additionally or alternatively, while an emission target may be independent of a time of day, an average allowable emission amount from each vehicle in the region may decrease as traffic (e.g., a number of vehicles) increases. In this way, even if all vehicles in the region are meeting an emission regulation different than the emission target, emissions from all the vehicles may still exceed the emission target of the region. If the total current emissions are not greater than the total region emission threshold, then the method 600 proceeds to 608 to estimate future emissions of vehicles within the region. The future emissions may be estimated via the same parameters used to estimate current emissions, however, upcoming road conditions including speed limits, road congestion, traffic lights, and the like are further included in the estimation.

The method 600 proceeds to 610 following 608 to determine if future total emissions are greater than the total region emission threshold. If the future total emissions are estimated to be less than or equal to the total region emission threshold, then the method 600 proceeds to 612 to maintain current engine operating parameters. In this way, current emissions and future emissions are less than or equal to the total region emission threshold and adjustments to aftertreatment system conditions and/or engine emission output are not desired.

However, if the total current emissions at 606 or if the future total emissions at 610 are greater than the total region emission threshold, then the method 600 proceeds to 614 to alert participating vehicle operators. Participating vehicle operators may correspond to vehicle operators operating a vehicle with the electronic application. The alert may be in the shape of a text message, email, phone call, voice mail, or the like. Additionally or alternatively, the alert may include a prompt on a vehicle cabin screen corresponding to a navigation system or infotainment system screen.

In some examples, additionally or alternatively, not all vehicle operators comprising a vehicle with the electronic application may select to participate in meeting the emission target of the region. For example, an option may be displayed on a screen in a vehicle cabin interior to participate in meeting the emission target of the region. If the vehicle operator declines to participate, then emissions from their vehicle may be adjusted based on the emission target or total emissions from all vehicles in the region. Conversely, vehicles of vehicle operators who select to participate in meeting the emission target may adjust engine operating parameters to decrease their emission output in order to decrease the total emission output of vehicles in the region.

The method 600 proceeds to 616, which includes providing driving behavior adjustment tips to each of the participating vehicle operators. The tips may include decreasing an acceleration rate during tip-ins, decreasing a deceleration rate during braking events, decrease an air conditioning rate, decrease auxiliary device power consumption (e.g., cell phone, music player, and the like), inflate tires, and the like.

The method 600 proceeds to 618, which may include determining if the driver behavior is adjusted. This may be determined by tracking if one or more of the tips are being followed by the vehicle operator. If the driver behavior is not adjusted, then the method 600 proceeds to 620, which may include adjusting engine operating parameters to decrease emissions while still meeting driver demand. For example, an adjustment may include increasing exhaust gas temperatures to light-off an aftertreatment device. Such an adjustment may include an increased post-fuel injection, which may not affect driver demand.

If the driver behavior is adjusted and/or if the engine operating parameters were adjusted, the method 600 proceeds to 622, which includes determining if current total emissions are still greater than the total region emission threshold. If the adjusted driver behavior or the non-intrusive adjustments to engine operating parameters in the vehicles with the electronic application are cumulatively sufficient to decrease the total emissions to an emission value less than or equal to the total region emission threshold, then the method 600 proceeds to 624 to maintain current operating parameters and does not intrusively adjust engine operating parameters.

However, if the current total emissions are still greater than the total region emission threshold, then the method 600 proceeds to 626, which may include intrusively adjusting engine operating parameters. As such, the adjusted driver behavior and/or the adjusted engine operating parameters may be insufficient, and as a result, engine operating parameters may be further adjusted which may affect drivability. For example, engine power output may be reduced to decrease an engine emission output. In one example, adjusting engine operating parameters comprises one or more of increasing an exhaust gas temperature, regenerating an aftertreatment device, injecting reductant into an exhaust passage, and decreasing an engine power output In this way, the method 600 illustrates a method of an electronic application programmed into non-transitory memory of a plurality of vehicles. The electronic application may be continuously executed, wherein a plurality of vehicles with the electronic application in a first region may be in communication with one another. In some examples, the plurality of vehicles in the first region may not be in communication with vehicles in a second region different than the first region. However, in some examples, if emissions in the second region are affected by emissions in the first region, then the vehicles in the two regions may be in communication.

The plurality of vehicles with the electronic application may allow a vehicle operator to select to participate in meeting an emission target for a region. As such, the electronic application may estimate a current total emission value and simulate and/or predict a future emission value for the plurality of vehicles with the electronic application and for vehicles without the electronic application. In this way, vehicle with the electronic application may receive the burden of decreasing their emission output while vehicles without the electronic application may be unaware of the emission target for the region. As such, if a vehicle operator does not select to participate in the meeting the emission target, then the vehicle operating parameters may not adjust in response to the emission target not being met by all the vehicles in the region.

However, vehicle operators who select to participate in meeting the emission target for the region may receive an alert if the emission target is not being met or if the target will not be met in the future. The alert may provide tips for adjusting a driver behavior to decrease emissions of the individual vehicle. Additionally, the vehicle operator may select to allow the electronic application to automatically adjust engine operating parameters to decrease an overall emission output of the vehicle, even if some engine operating parameters with higher engine power output are no longer available to the vehicle operator (such as high engine speeds).

In some examples, the electronic application may further include a leaderboard, wherein the leaderboard displays emissions outputs of the vehicles in the region and ranks the vehicles from highest to lowest. In this way, the leaderboard may promote competition among the participating vehicle operators to further decrease their individual emission output, thereby decreasing a total emission of all the vehicles in the region to a value closer to the emission target.

Turning now to FIG. 7, it shows a method 700 for estimating current and future emissions in a region. The method 700 begins at 702, which includes estimating a number of vehicles driving in a region. Estimating the number of vehicles may be based on empirical data associated with the time of day, day of week, weather, location of the region, events, and the like. Additionally or alternatively, the number of vehicles may be estimated based on feedback from street cameras and/or other cameras coupled to stores and the like. Additionally or alternatively, vehicles cameras may provide feedback regarding a number of nearby vehicles and may be used to estimate the number of vehicles in the region.

The method 700 proceeds to 704, which includes calculating emissions of vehicles with the electronic application as described above. That is to say, each individual vehicle with the electronic application may calculate its own emissions, wherein each vehicle may provide feedback regarding their own emissions, and the individual emission outputs may be summed to determine a total emissions of vehicles with the electronic application.

The method 700 proceeds to 706, which includes estimating emission of vehicles without the electronic application. In one example, each of the vehicles without the electronic application is assumed to be a similar vehicle type with an emission output based on an average or a median emission output of vehicles with the electronic application. In this way, an emission output of each of the vehicles without the electronic application is estimated to be equal. Additionally or alternatively, a vehicle type of the vehicles without the electronic application may be assumed to be similar to a vehicle type of vehicles with the electronic application. For example, if 50% of the vehicles with the electronic application are sport utility vehicles (SUVs), then 50% of the vehicles without the electronic application may be assumed to be SUVs. An emission output of the SUVs with the electronic application may be totaled and averaged, wherein the average emission output may be assumed for each of the assumed SUVs without the electronic application.

The method 700 proceeds to 708, which includes estimating a total current emission in the region. The total current emission in the region may be determined via totaling emissions of all the vehicles in the region at 710. However, the total current emission in the region may be further based on retrieved weather data at 712. For example, if the weather is windy, then the emissions in the region may be less than the total emissions output by all the vehicles in the region due to some of the emissions being carried out of the region by the wind. Conversely, the weather may increase the emissions if the wind carries emissions from another region into the current region. Rain, snow, and like may further adjust the total current emissions in the region.

The method 700 proceeds to 714, which includes estimating further current emissions in the region. This may include simulating operating parameters and ambient conditions in the region. The simulated operating parameters may include estimating emissions in combination with upcoming road conditions including traffic lights, vehicle speeds, congestion, and the like. The future current emissions may be compared to the current total emissions to ensure the value is within an expected threshold (e.g., ±20% of the current total emissions).

In this way, operating parameters of a plurality of vehicles within a region may be adjusted to adjust emissions from the plurality of vehicles to meet an emission target of the region. The technical effect of adjusting engine operating parameters in the plurality of vehicles, which is a portion of all vehicles in the region, is to decrease emissions in the region to be equal to or less than the emission target of the region without arranging the electronic application on all the vehicles in the region. In this way, manufacturing costs of vehicles may decrease and emission targets may still be met via a sub-set of vehicles.

In another representation, a method for adapting at least one operating parameter of an apparatus for aftertreatment of the exhaust gas of a motor vehicle, wherein the method comprises the following steps speed progressions of a number of motor vehicles in the course of traveling within a defined spatial region are generated for the defined region via a model and communicated to at least one model for simulating the operating parameters of a motor-vehicle engine and for simulating an apparatus for aftertreatment of the exhaust gas of the motor-vehicle engine, via the model for simulating the operating parameters of the motor-vehicle engine and for simulating the apparatus for exhaust-gas aftertreatment, the current emissions of each motor vehicle of the number of motor vehicles are determined, and the defined emissions are communicated to an evaluating device, with the aid of the evaluating device the emission quantity brought about by the number of motor vehicles in the course of traveling within the defined region is ascertained, and the ascertained emission quantity is compared with a stipulated emission threshold value for the defined region, if the emission threshold value stipulated for the defined region is attained or exceeded, at least one operating parameter of the apparatus for exhaust-gas aftertreatment is adapted in such a way that the emission threshold value stipulated for the defined region is fallen short of, the at least one adapted operating parameter of the apparatus for exhaust-gas aftertreatment is communicated to the model for simulating the operating parameters of the motor-vehicle engine and for simulating the apparatus for exhaust-gas aftertreatment.

A first example of the method further includes where speed progressions of a number of motor vehicles for the defined region are generated via a model for simulating the traffic volume, said model for simulating the traffic volume being configured to generate and/or to receive and to process model data relating to various driving styles and/or to various traffic densities and/or model data relating to the environment and/or model data pertaining to traffic-signal switching cycles and/or data for mapping the environment.

A second example of the method, optionally including the first example, further includes where the defined emissions are emissions of nitrogen oxide and/or emissions of carbon dioxide and/or emissions of fine dust.

A third example of the method optionally including any of the above examples further includes where the emission quantity brought about by the number of motor vehicles in the course of traveling within the stipulated region is ascertained via a model for a virtual reality.

A fourth example of the method optionally including any of the above examples further includes where at least one boundary condition is set in the evaluating device if an unintended result is observed.

In another embodiment, a control apparatus for adapting at least one operating parameter of an apparatus for aftertreatment of the exhaust gas of a motor vehicle, wherein the control apparatus comprises a device for generating speed progressions of a number of motor vehicles in the course of traveling within a defined spatial region via a model, a device for determining the current emissions of each motor vehicle of the number of motor vehicles via a model for simulating the operating parameters of the motor-vehicle engine and for simulating the apparatus for exhaust-gas aftertreatment, an evaluating device which is configured to ascertain the emission quantity brought about by the number of motor vehicles in the course of traveling within the defined region, and to compare the ascertained emission quantity with a stipulated emission threshold value for the defined region, and a device for adapting at least one operating parameter of the apparatus for exhaust-gas aftertreatment.

A first example of the control apparatus further comprises where the control apparatus includes a device for generating a virtual environment, and the device for generating speed progressions via a model is configured for receiving data from, and for outputting data to, the device for generating a virtual environment, and for outputting data relating to the speed of a number of motor vehicles to the device for determining the current emissions.

A second example of the control apparatus optionally including the first example further includes where the control apparatus includes a device for generating a virtual environment, and the device for determining the current emissions is configured for receiving data relating to the speed of a number of motor vehicles from the device for generating speed progressions via a model, and for receiving data relating to catalytic-converter parameters from the evaluating device, and for outputting data to the device for generating a virtual environment.

A third example of the control apparatus optionally including any of the above examples further includes where the control apparatus includes a device for generating a virtual environment and a device for visualizing the emission quantity in at least one defined region, said device for generating a virtual environment being configured for receiving data from, and outputting data to, the device for generating speed progressions via a model, and for receiving data from the device for determining the current emissions, and for outputting data to the evaluating device and/or the device for visualizing the emission quantity.

A fourth example of the control apparatus optionally including any of the above examples further includes where the control apparatus includes a device for generating a virtual environment, and the evaluating device is configured for receiving data from the device for determining the current emissions, and for receiving data from the device for generating a virtual environment, and for outputting data relating to operating parameters of the apparatus for exhaust-gas aftertreatment to the device for determining the current emissions.

An embodiment of a system comprises an engine fluidly coupled to an exhaust passage housing an aftertreatment device and a controller with computer-readable instructions stored thereon that when executed enable the controller to estimate a total current emission output of all vehicles within a region and adjust engine operating parameters of a portion of all vehicles within the region if the total current emission output is greater than an emission target of the region.

A first example of the system further includes where the emission target is a dynamic value, wherein the emission target increases if ambient conditions carry emissions out of the region.

A second example of the system, optionally including the first example, further includes where the emission target is decreased if ambient conditions carry emissions into the region.

A third example of the system optionally including any of the above examples further includes where the portion of all vehicles includes vehicles comprising an electronic application configured to estimate the total current emission output, wherein the electronic application is further configured to estimate a future total emission output.

A fourth example of the system optionally including any of the above examples further includes where engine operating parameters are adjusted in response to the future total emission output exceeding the emission target of the region.

A fifth example of the system optionally including any of the above examples further includes where the region is one or more of a school, shopping mall, urban area, stadium, neighborhood, zip code, county, state, and country.

An embodiment of a method comprises estimating a total emission output of all vehicles within a region, wherein the estimating includes calculating an emission output of a plurality of vehicles within the region and using an average emission output of the plurality of vehicles to assume an emission output of a remaining portion of vehicles and adjusting engine operating parameters in the plurality of vehicles in response to the total emission output being greater than an emission target of the region.

A first example of the method further includes where the emission target is adjusted based on weather, and where weather transferring emissions out of the region increases the emission target, and where weather trapping emissions in the region or bringing emissions into the region decrease the emission target.

A second example of the method optionally including the first example further includes where simulating subsequent operations of all vehicles within the region and estimating the total emission output of all vehicle within the region during subsequent operations, and adjusting current engine operating parameters to decrease emissions in response to the total emission output being greater than the emission target during subsequent operations.

A third example of the method, optionally including any of the above examples, further includes where the simulating comprises each of all the vehicles is a single-type of vehicle, and where the single-type of vehicle is one of the plurality of vehicles.

A fourth example of the method, optionally including any of the above examples, further includes where adjusting engine operating parameters comprises one or more of increasing an exhaust gas temperature, regenerating an aftertreatment device, injecting reductant into an exhaust passage, and decreasing an engine power output.

A fifth example of the method, optionally including any of the above examples, further includes where vehicle operators of the plurality of vehicles select to participate in meeting the emission target, and where tips are displayed to the vehicle operator on a screen in the vehicle cabin for adjusting driver behavior to decrease emissions.

A sixth example of the method, optionally including any of the above examples, further includes where the tips comprise one or more of decreasing an acceleration rate during a tip-in, decrease a deceleration rate during a braking event, decreasing auxiliary device power consumption, decreasing an air/conditioning level, and inflating tires.

A seventh example of the method, optionally including any of the above examples, further includes where displaying a scoreboard to the screen, wherein the scoreboard illustrates an emission reduction percentage of the plurality of vehicles whose vehicles operators selected to participate in meeting the emission target.

An eighth example of the method, optionally including any of the above examples, further includes where adjusting engine operating parameters does not occur in the remaining portion of vehicles and in vehicles whose vehicle operators chose not to participate in meeting the emission target.

An embodiment of a system comprises an engine fluidly coupled to an exhaust passage housing an aftertreatment device and a controller with computer-readable instructions stored thereon that when executed enable the controller to estimate a total current emission output of all vehicles within a region adjust engine operating parameters of a portion of all vehicles within the region if the total current emission output is greater than an emission target of the region, wherein the emission target is adjusted based on weather in the region.

A first example of the system further includes where the instructions further enable the controller to increase the emission target in response to ambient conditions carrying a portion of the emissions out of the region and decrease the emission target in response to ambient conditions carrying emission from outside the region to inside the region.

A second example of the system optionally including the first example further includes where the portion of all vehicles are in communication with one another, wherein vehicle operators of the portion of all vehicles are provided an option to participate in meeting the emission target of the region, wherein engine operating parameters are adjusted online in the portion of all vehicles whose vehicle operators selected to participate in meeting the emission target.

A third example of the system, optionally including any of the above examples further includes where a number of all vehicles is estimated based on one or more of a time of day and a location of the region.

A fourth example of the system, optionally including any of the above examples, further includes where the aftertreatment device is one or more of a particulate filter, a lean $NO_x$ trap, a selective catalytic reduction device, and an oxidation catalyst.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system, comprising:
an engine fluidly coupled to an exhaust passage housing an aftertreatment device; and
a controller with computer-readable instructions stored thereon that when executed enable the controller to:
estimate a total current emission output of all vehicles within a region;
adjust engine operating parameters of a portion of all vehicles within the region if the total current emission output is greater than an emission target of the region.

2. The system of claim 1, wherein the emission target is a dynamic value, wherein the emission target increases if ambient conditions carry emissions out of the region.

3. The system of claim 2, wherein the emission target is decreased if ambient conditions carry emissions into the region.

4. The system of claim 1, wherein the portion of all vehicles includes vehicles comprising an electronic application configured to estimate the total current emission output, wherein the electronic application is further configured to estimate a future total emission output.

5. The system of claim 4, wherein engine operating parameters are adjusted in response to the future total emission output exceeding the emission target of the region.

6. The system of claim 1, wherein the region is one or more of a school, shopping mall, urban area, stadium, neighborhood, zip code, county, state, and country.

7. A method, comprising:
estimating a total emission output of all vehicles within a region, wherein the estimating includes calculating an emission output of a plurality of vehicles within the region and using an average emission output of the plurality of vehicles to assume an emission output of a remaining portion of vehicles; and
adjusting engine operating parameters in the plurality of vehicles in response to the total emission output being greater than an emission target of the region.

8. The method of claim 7, wherein the emission target is adjusted based on weather, and where weather transferring emissions out of the region increases the emission target, and where weather trapping emissions in the region or bringing emissions into the region decrease the emission target.

9. The method of claim 7, further comprising simulating subsequent operations of all vehicles within the region and estimating the total emission output of all vehicle within the region during subsequent operations, and adjusting current engine operating parameters to decrease emissions in response to the total emission output being greater than the emission target during subsequent operations.

10. The method of claim 9, wherein the simulating comprises each of all the vehicles is a single-type of vehicle, and where the single-type of vehicle is one of the plurality of vehicles.

11. The method of claim 7, wherein adjusting engine operating parameters comprises one or more of increasing an exhaust gas temperature, regenerating an aftertreatment device, injecting reductant into an exhaust passage, and decreasing an engine power output.

12. The method of claim 7, wherein vehicle operators of the plurality of vehicles select to participate in meeting the emission target, and where tips are displayed to the vehicle operator on a screen in the vehicle cabin for adjusting driver behavior to decrease emissions.

13. The method of claim 12, wherein the tips comprise one or more of decreasing an acceleration rate during a tip-in, decrease a deceleration rate during a braking event, decreasing auxiliary device power consumption, decreasing an air/conditioning level, and inflating tires.

14. The method of claim 12, further comprising displaying a scoreboard to the screen, wherein the scoreboard illustrates an emission reduction percentage of the plurality of vehicles whose vehicles operators selected to participate in meeting the emission target.

15. The method of claim 12, wherein adjusting engine operating parameters does not occur in the remaining portion of vehicles and in vehicles whose vehicle operators chose not to participate in meeting the emission target.

16. A system, comprising:
an engine fluidly coupled to an exhaust passage housing an aftertreatment device; and
a controller with computer-readable instructions stored thereon that when executed enable the controller to:
estimate a total current emission output of all vehicles within a region;
adjust engine operating parameters of a portion of all vehicles within the region if the total current emission output is greater than an emission target of the region, wherein the emission target is adjusted based on weather in the region.

17. The system of claim 16, wherein the instructions further enable the controller to increase the emission target in response to ambient conditions carrying a portion of the emissions out of the region and decrease the emission target in response to ambient conditions carrying emission from outside the region to inside the region.

18. The system of claim 16, wherein the portion of all vehicles are in communication with one another, wherein vehicle operators of the portion of all vehicles are provided an option to participate in meeting the emission target of the region, wherein engine operating parameters are adjusted online in the portion of all vehicles whose vehicle operators selected to participate in meeting the emission target.

19. The system of claim 16, wherein a number of all vehicles is estimated based on one or more of a time of day and a location of the region.

20. The system of claim 19, wherein the aftertreatment device is one or more of a particulate filter, a lean $NO_x$ trap, a selective catalytic reduction device, and an oxidation catalyst.

* * * * *